June 26, 1962 G. C. FOSTER 3,041,502
CIRCUIT INTERRUPTER
Filed Dec. 2, 1959
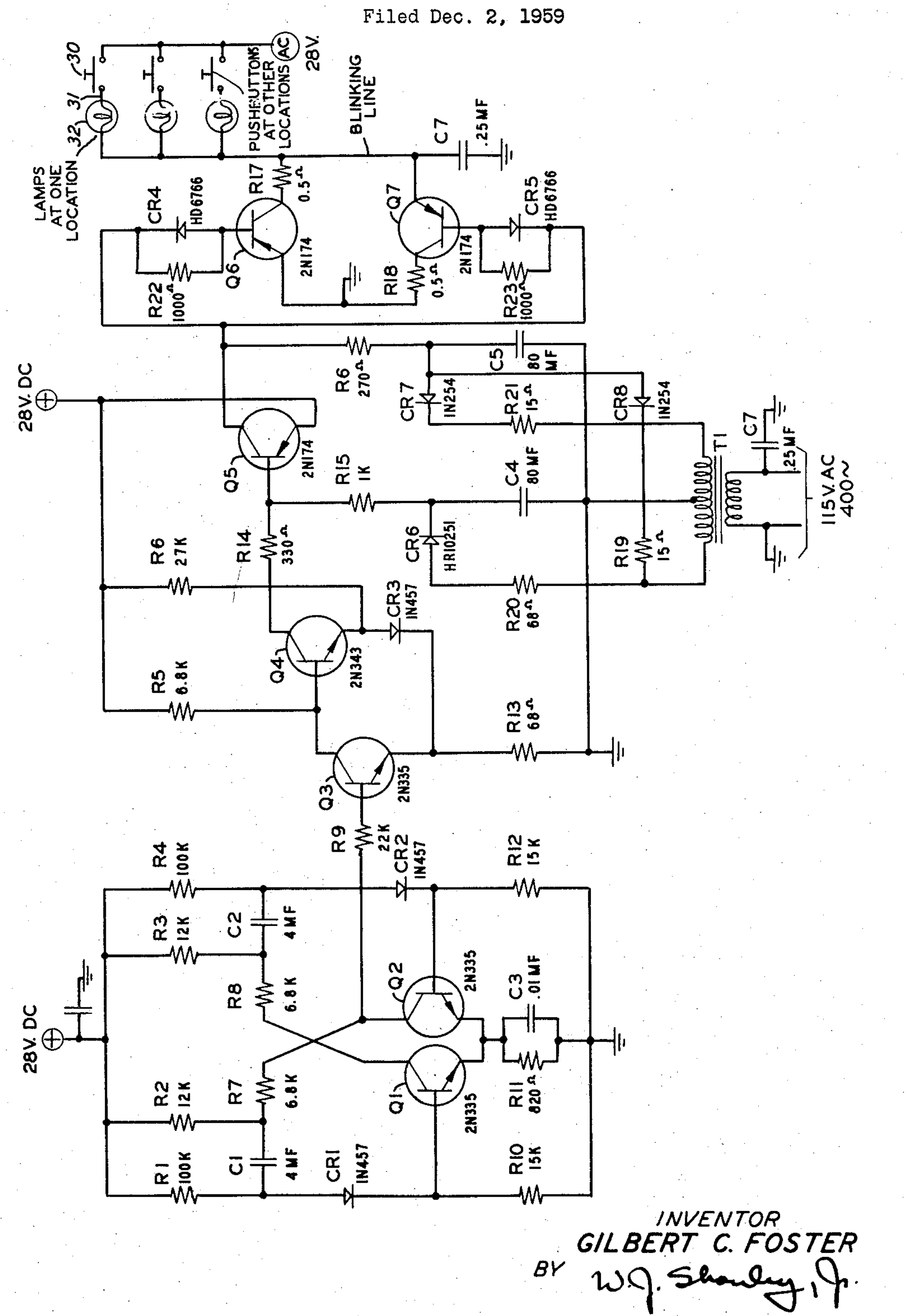
INVENTOR
GILBERT C. FOSTER
BY W. J. Shanley, Jr.
ATTORNEY United States Patent Office 3,041,502
Patented June 26, 1962

3,041,502

CIRCUIT INTERRUPTER

Gilbert C. Foster, Rochester, N.Y., assignor to General Dynamics Corporation, Rochester, N.Y., a corporation of Delaware Filed Dec. 2, 1959, Ser. No. 856,855
6 Claims. (Cl. 315—217)

This invention relates to electrical switching means and particularly to circuit makers and the means employed to operate circuit makers continuously and periodically.

The object of the invention is to provide a flashing unit for an indicator lamp supply which is completely electronic and silent, using no mechanical parts nor thermal properties for its operation and being immediately ready and responsive to seizure for use to provide circuit interrupting means operating at a predetermined rate. It is conventional in signaling systems to employ mechanical means, such as circuit interrupters driven by electrical motors and it is likewise conventional to employ thermal means for the same purpose, as in automobile turn indicators.

In accordance with the present system, a plurality of transistors are wired into a circuit arrangement requiring a minimum of power and which may supply a flashing circuit extending to a plurality of stations and which may operate from none to a large plurality of indicator lamps at a time.

By way of example, the device of the present invention may be used in a communication system where there are a large number of stations each of which is provided with means to signal others in the system, each such station being provided with circuit maker means, such as a push-button leading to an indicator lamp at each of the other stations to which it may have access. Thus, in the wiring arrangement of such a system there will be included among the supply conductors a common line known as the blinking line to which all the calling indicators at such a station are connected and likewise there will be included a common battery supply line to which all the calling buttons at such a station are connected, the interconnection of the calling buttons at each such station and the associated indicator lamps at the distant stations being individual.

The invention consists of a network of electronic components, such as commercially available resistors, condensers, transistors and diodes. There is a conventional multivibrator adjusted by the value of its components to operate steadily at the rate of 2.5 c.p.s. (or any other rate which might be desired) used as a prime driver, this being followed by transistor amplifying means to a final set of switching output transistors capable of working a circuit carrying as much as 1.5 amperes (40 lamps at 40 milliamperes each).

The output stage consists of a driver which periodically (at the rate of 2.5 c.p.s.) applies a positive potential to the bases of a pair of switching output transistors having also a power feed connection to a source of alternating current which is used for energizing the indicator lamps. In accordance with the present invention these two output transistors each alternately conduct the lamp current to produce a substantially continuous energization of the lamps during the 2.5 c.p.s. "on stage" of the driver and alternately bar the flow of current through the lamp circuit during the "off stage" of the driver. It will be understood that the frequency of the alternating current for the energization of the lamps is comparatively high, in one case, by way of example, being 400 c.p.s. Hence these two output transistors, being alternately controlled and rendered alternately conductive at 400 c.p.s., will act substantially as a circuit maker operating at 2.5 c.p.s.

A feature of the invention may then be stated as the provision of a circuit arrangement in which a pair of transistors acting together as a gate to open and close a circuit at a desired rate, alternately operate at a much higher rate to maintain substantially continuous the said open or closed circuit condition. Through such means a circuit interrupter may be provided having no moving parts nor thermal elements, immediately ready for operation and capable of comparatively heavy duty.

Another feature of the invention is a means to supply a small and limited current in the interrupted circuit whereby tungsten filament lamps therein while cooling sufficiently to become dark in the interrupted part of the cycle will, nevertheless, remain warm enough to avoid the heavy current drain characteristic of this circuit element. Such a means is of particular value in a circuit where the effective interruptions of the circuit are carried out by transistor means.

The drawings consist of a single figure in the form of a schematic circuit diagram.

In these drawings various values and types of components are given by way of example and it will be understood that these are capable of change without departing from the spirit of the invention. The two NPN transistors Q1 and Q2 and the electronic network in which they are connected is a conventional multivibrator, here adjusted to transmit to the base of the first driver Q3 a signal at the rate of 2.5 c.p.s. This multivibrator drives three transistors Q3, Q4 and Q5 in turn and the latter acts to apply a positive direct current potential (+28 volts, D.C.) to the base circuits of the output switching transistors Q6 and Q7 at this rate of 2.5 c.p.s. The circuit network about these switching transistors terminates in the conductor termed the blinking line and this line as well as another line here marked 28 volts A.C. are extended in common to each intercom station. With such an arrangement a switch or push button 30 at one station may be connected over an individual line 31 to a lamp 32 which has its other terminal connected in common with all the other lamps (as many as 285) to the blinking line. When as few as one switch 30 or as many as 40 such switches are simultaneously closed, the 28 volt alternating current source (having a frequency of 400 c.p.s.) is connected to the collector of Q6 and the emitter of Q7. This starts the following operations.

The first five of these transistors, Q1, Q2, Q3, Q4 and Q5 function in two states: (1) fully saturated and conducting, and (2) reverse biased and non-conducting. The last two transistors, Q6 and Q7, ground the blinking line at the flashing rate, thus energizing the lamps whose circuits have been closed with 28 volts alternating current. By way of example, these lamps may be General Electric type 334 and each has a 40 milliampere operating current at 28 volts.

In the conductive state transistor Q5 applies +28 volts (direct current) to the bases of the output transistors Q6 and Q7. In the non-conductive state of Q5, the output transistors Q6 and Q7 are driven to saturated conduction by the 270 ohm resistor R–6 returned to —40 volts which is supplied by diodes CR–7 and CR–8 and resistors R–19 and R–21 connected as a full-wave rectifier to transformer T–1, the primary of which is connected to a source of 115 volts A.C. The operating potentials for Q4 and Q5 are provided by diodes CR–6, resistor R–20 and capacitor C–4 which are connected as a half-wave rectifier to the secondary of power transformer T–1. When transistor Q5 is non-conductive, transistors Q6 and Q7 are driven to conduction and when Q5 is conductive the transistors Q6 and Q7 are barred from conduction. This last statement must be modified by the statement that when Q5 is non-conductive, the two transistors Q6 and Q7 are alternately driven to conduction by the alternating current applied thereto through the lamps, such as the lamp 32, whereby it appears that during the periods in which the transistor Q5 is non-conductive a circuit for the lamp 32 is closed through the combination of the two transistors Q6 and Q7 and that during the periods in which the transistor Q5 is conductive such lamp circuit is effectively opened.

Considering the alternating current applied through the lamp to the transistors Q6 and Q7, it may be noted that on the negative half cycle, the sine wave reaches a peak of —40 volts. The base current of transistor Q6 is sufficient in flowing from ground to the negative supply through the 270 ohm resistor R–6 to fully saturate Q6 under a load of at least 30 lamps so that the collector of Q6 is at ground potential and the lamp load fully energized.

At the same time, the collector of transistor Q7 will be functioning essentially as an emitter and the base current will flow through the 270 ohm base resistor R–6. The gain of Q7 in the reverse direction will be quite low, however, and not contribute much to the alternating current load current. Since Q7 does not contribute much, the purpose of the .5 ohm collector resistor R–18 is to divert most of the base current to transistor Q6 where the gain will be much higher. Otherwise the available base current would be split between Q6 and Q7 therefore robbing Q6 of useful base current.

On the positive half cycle a peak of plus 40 volts is reached. As the blinking line tries to rise above ground potential, the emitter of transistor Q7 conducts and the base current flows to the negative supply, transistor Q7 being fully saturated so that the emitter thereof is grounded through the .5 ohm collector resistor R–8. Similarly, transistor Q6 will function in the reverse direction, its collector acting as an emitter but with a much lower gain than Q7. The .5 ohm resistor R–17 in the collector of Q6 serves to divert current into the emitter and base of Q7 since Q7 is not operating most efficiently with a high gain. As before, most of the available base current is passed through transistor Q7 where it is utilized most advantageously.

Now let us consider the conditions where the driver Q5 is conductive. The plus 28 volts is applied to the bases of the two output transistors Q6 and Q7. Now, on the negative half cycle of the alternating current load voltage no conduction takes place through Q6 and Q7 since they are both reverse biased, with their bases at +28 volts and the emitter of Q6 (and the collector of Q7) at ground potential.

On the positive half cycle of the alternating current load, Q6 and Q7 remain cut off until the cycle reaches +28 volts and from this point and to —40 volts there is conduction so that the lamp load does receive these peaks of current during the off time of the blink. This is not sufficient to be noticeable and serves to keep the lamp filament warm thereby tending to reduce surges from the off to on condition due to the known properties of tungsten filaments.

The base diodes CR–4 and CR–5 are used for protection purposes. Protection is needed only on transistor Q7, but a diode CR–4 is also placed in the base circuit of Q6 to balance the stages which is necessary for the base current splitting described above. The nature of this protection is as follows.

When Q6 and Q7 are in the cutoff condition, the emitter of Q7 goes to a maximum of —40 volts while the base supply is at +28 volts. This would be a reverse base to emitter voltage of 68 volts, but the junction is only rated at 60 volts. If there is a breakdown the diode will limit the current since it is in the reverse direction. The diode is shunted by a 1K resistor which will allow a certain breakdown current to flow but of a value insufficient to damage the transistor. The 1K shunt is necessary to reduce the base impedance for $I_{co}$ current considerations in the cutoff position. The diode alone would represent too high an impedance and cause a runaway condition at high temperature operation.

It may be noted that operation with a 28 volt direct current lamp potential is possible. In this case, only transistor Q7 will then perform a useful function, transistor Q6 being superfluous.

What is claimed is:

1. An interrupter circuit comprising a pair of controllable electron flow devices connected in a first parallel circuit so as to conduct in opposite directions, each of said devices having a control electrode, means for alternately applying first and second bias potentials in common to said control electrodes, a plurality of manually operable switch means, a plurality of indicator means, means for connecting each of said switch means in series with a corresponding indicator means, means for connecting said series circuits in a second parallel circuit, a source of A.C. potential, and means for connecting said first and second parallel circuits in series with said source of A.C. potential, said first bias potential being of a magnitude and polarity such that the impedance of said first parallel circuit is large enough so as to prevent the operation of indicator means which are associated with operated switches during the period said first bias potential is applied to said control electrodes, said second bias potential being of a magnitude and polarity such that the impedance of said first parallel circuit is small enough so as to allow the operation of indicator means which are associated with operated switches.

2. An interrupter circuit comprising first and second transistors, means for connecting the emitter of said first transistor and the collector of said second transistor to a first point, means for connecting the emitter of said second transistor and the collector of said first transistor to a second point, means for alternately applying first and second bias potentials in common to the base electrodes of said first and second transistors, a plurality of manually operable switch means, a plurality of indicator means, means for connecting each of said switch means in series with a corresponding indicator means, a source of A.C. potential, means for connecting said series circuits in parallel between one side of said source and said second point, and means for connecting said first point to the other side of said source, said first bias potential being of a magnitude and polarity such that the collector current of said transistors is insufficient to operate indicator means which are associated with operated switches, said second bias potential being of a magnitude and polarity such that the collector current of said transistors is large enough so as to operate indicator means which are associated with operated switches.

3. An interrupter circuit comprising a pair of controllable electron flow devices connected in a first parallel circuit so as to conduct in opposite directions, each of said devices having a control electrode, means for alternately applying first and second bias potentials in common to said control electrodes, a plurality of manually operable switch means, a plurality of lights located at a given location, each of said switch means being located remotely from said given location, each light being individually associated with corresponding switch means, means for connecting each of said switch means in series with the corresponding indicator light, means for connecting said series circuits in a second parallel circuit, a source of A.C. potential, and means for connecting said first and second parallel circuits in series with said source of A.C. potential, said first bias potential being of a magnitude and polarity such that the impedance of said first parallel circuit is large enough so as to limit the current flow through indicator lights which are associated with operated switches so that such indicators will not operate during the time said first bias potential is applied to said control electrodes, said second bias potential being of a magnitude and polarity such that the impedance of said first parallel circuit is small enough so as to allow sufficient current flow to operate indicator lights which are associated with operated switches.

4. An interrupter circuit comprising first and second PNP transistors, means for connecting the emitter of said first transistor and the collector of said second transistor to a first point, means for connecting the emitter of said second transistor and a collector of said first transistor to a second point, means for alternately applying first and second bias potentials in common to the base electrodes of said first and second transistors at a given frequency, a plurality of manually operable switch means, a plurality of indicator lights located at a given location, each of said switch means being located remotely from said given location, a source of A.C. potential, conductors interconnecting each of said remote stations with said central station, means for connecting one side of each of said switch means in common to one side of said source, means for connecting the other side of each of said switch means to the remote station end of said conductors, means for connecting the other end of each of said conductors to one side of the corresponding indicator lights, and means for connecting the other side of said indicator lights in common to said second point, means for connecting said first point to the other side of said source, said first bias potential being a positive voltage of a magnitude such that the collector current of said transistors is insufficient to operate the indicator lights which are associated with operated switches, said second bias potential being a negative voltage of a magnitude such that the collector current of said transistors is large enough so as to operate indicator lights which are associated with operated switches.

5. The combination of claim 4 in which said indicator lights are tungsten filament lights, said source of A.C. potential provides an A.C. signal having a frequency substantially greater than said given frequency and a peak value greater than said first bias potential so that said second transistor conducts during the time said first bias potential is applied to said base electrodes when the positive half-cycle of said A.C. source exceeds said first bias potential, said peak potential of said A.C. source and said frequency of said source being small relative to said first bias potential and said given frequency, respectively, so that the current flowing during said first bias potential period is insufficient to cause said lights to visibly glow whereby the light filaments are kept warm during the off period of said lights.

6. The combination of claim 2 in which said means for connecting the collector of said first transistor to said second point includes a first series resistance and said means for connecting the collector of said second transistor to said first point includes a second series resistance whereby the base currents are diverted from the corresponding collector to the associated emitter when said common points assume a potential which places a forward bias on the emitter junction.

References Cited in the file of this patent

UNITED STATES PATENTS

| | | |
|---|---|---|
| 2,166,309 | Lord | July 18, 1939 |
| 2,599,675 | Volz | June 10, 1952 |
| 2,841,239 | Hall et al. | July 1, 1958 |
| 2,897,413 | Hodges | July 28, 1959 |